W. F. SPRENGNETHER.
TREAD BAND FOR PNEUMATIC TIRES.
APPLICATION FILED APR. 22, 1918.
1,271,957.
Patented July 9, 1918.
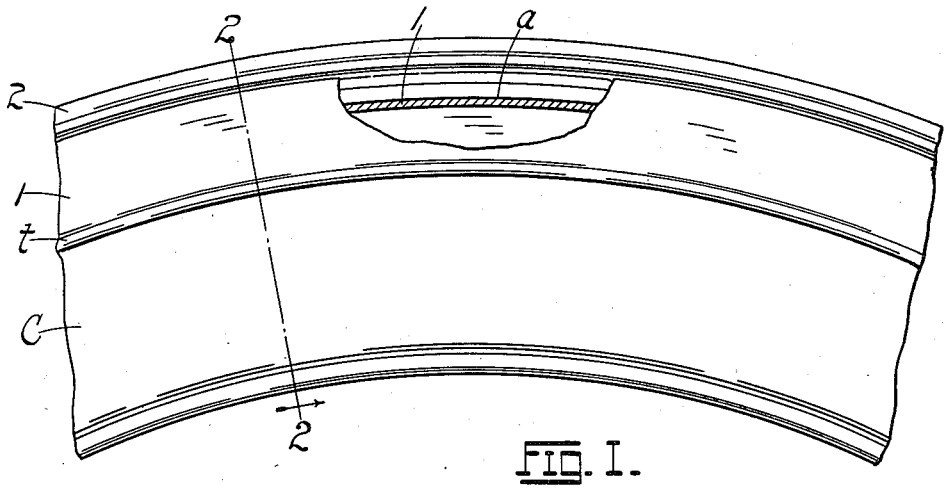
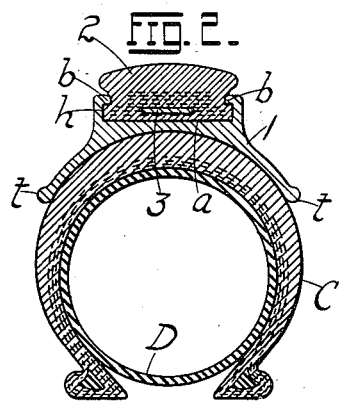
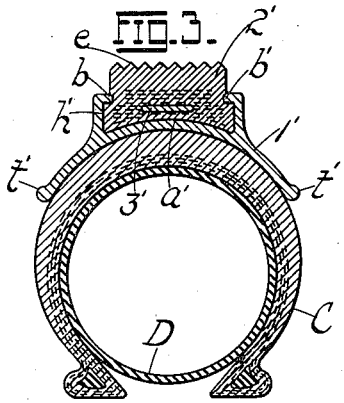
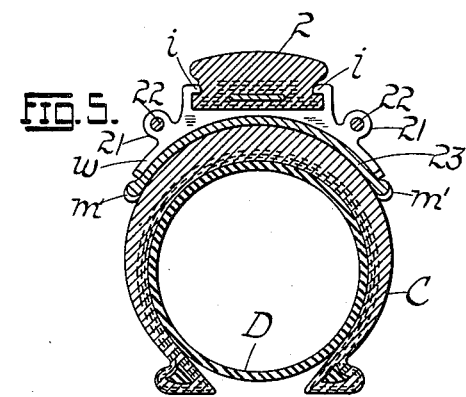
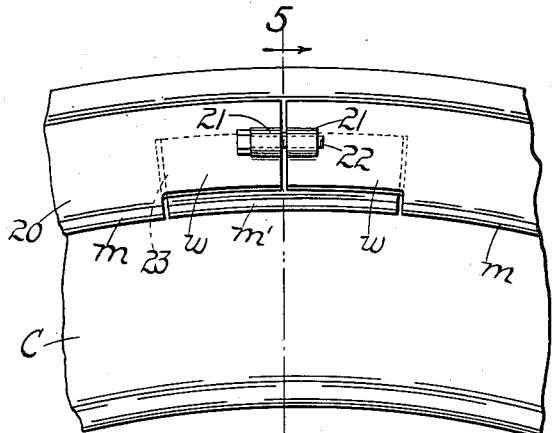
WITNESSES:
INVENTOR
Wm F. Sprengnether
BY ATTORNEY.

UNITED STATES PATENT OFFICE.

WILLIAM F. SPRENGNETHER, OF ST. LOUIS, MISSOURI.

TREAD-BAND FOR PNEUMATIC TIRES.

1,271,957.　　　　　Specification of Letters Patent.　　Patented July 9, 1918.

Application filed April 22, 1918.　Serial No. 230,039.

*To all whom it may concern:*

Be it known that I, WILLIAM F. SPRENGNETHER, a citizen of the United States, residing at St. Louis, State of Missouri, have invented certain new and useful Improvements in Tread-Bands for Pneumatic Tires, of which the following is a full, clear, and exact description, reference being had to the accompanying drawing, forming a part hereof.

The present invention is directed to tread or protecting bands for pneumatic tires, the object being to provide a preferably metallic band which may itself serve as a tread member for the tire, or be so constructed as to receive and maintain in position a rubber or equivalent tread band constituting a member independent of the protecting band proper. A further object is to provide a protecting band which may be either a continuous one-piece member encompassing the outer casing of the tire with which it is frictionally held in contact by the pressure of the air by which the inner sack is held inflated, or the band may be split transversely and the ends drawn together into abutting relation by means of screw-bolts or equivalent means, the band in either event being caused to hug the tire casing so that there will be no rotary creeping of the same on the casing when the tire is in service. The advantages of the invention will be fully apparent from the following detailed description in connection with the acompanying drawing in which—

Figure 1 represents a side elevation of a portion of a pneumatic tire showing one form of my invention applied thereto, with parts broken away; Fig. 2 is a cross section on the line 2—2 of Fig. 1; Fig. 3 is a similar cross-section showing a modified form of protecting band; Fig. 4 is a similar cross-section showing a modification in which the tread portion is formed directly on the protecting band; Fig. 5 is a cross-section on the line 5—5 of Fig. 6 showing a transversely split protecting band; and Fig. 6 is a side elevation of the split band at the meeting ends of the band.

Referring to the drawing and for the present to Figs. 1 and 2, C represents the outer casing and D the inner inflatable tube of the conventional pneumatic tire as well understood in the art. Encompassing the tread portion of the casing C and extending laterally to partially embrace the sides thereof is a (preferably) metallic protecting band 1 the inner surface of which conforms in curvature to substantially the curvature of the outer surface of the casing when the tire is fully inflated. In the form referred to the band 1 is a one-piece endless member and in practice is passed over the casing while the tire is deflated, the subsequent inflation of the tire causing the outer surface of the casing to be driven into firm frictional engagement with the inner surface of the band so that the band is firmly secured to the casing and rotary creeping thereof is prevented. The band is formed with an outer or peripheral groove or channel $h$ the bottom $a$ of which is cylindrical, the side walls of the groove being formed with inwardly turned lips or flanges $b$ for gripping the sides of a suitable fabric-and-rubber tread band 2 projecting a suitable radial distance beyond the flanges $b$ as shown. To prevent possible outward buckling of the member 2 the same has embedded therein a suitable metallic flat stiffening band 3 disposed adjacent the inner face of said member. To prevent the sides of the reinforcing band biting into the casing C, I form the same with rounded beads $t$ which at the same time serve to stiffen the edges of the band.

In Fig. 3 I show a modified form of protecting band 1' formed with a peripheral groove or channel $h'$ the bottom $a'$ of which is more or less arched transversely instead of being "flat" as shown in the form first described. In this modification the side walls of the groove $h'$ are likewise formed with inwardly turned lips or flanges $b'$ for securing in place the rubber tread member 2' which in said modification is shown with a serrated or roughened tread surface $e$ as well understood in the art. This tread member is likewise provided with a stiffening band 3', and the side edges of the member 1' are provided with beads $t'$ on the order of the beads $t$ in the form first described.

In Fig. 4 I show a modification in which the reinforcing band 10 itself constitutes the tread member, the same being formed with a roughened or serrated tread surface $e'$ as shown, and well understood in the art. In this modification the band is likewise formed with side beads $t''$ on the order of the beads $t$, $t'$.

As stated at the outset, the reinforcing band may be split and the ends brought together into abutting relation by means of screw-bolts or their equivalents. Such a modification is shown in Figs. 5 and 6. We there have a split band 20 with side beads *m* the latter being cut away or removed for a short distance on either side of the ends of the band. The resulting reduced terminals *w* of the band are provided on opposite sides with perforated lugs or ears 21 which aline with one another, each alining pair of lugs receiving a bolt 22 by which the ends of the band are drawn together and into abutting relation, precaution against the rubbing of the tire-casing C by the portions *w* as they are drawn together being taken by interposing between the casing and said portions *w* a suitable curved or transversely arched wearing plate 23, the sides of which are formed with beads *m'* which aline themselves with the beads *m* of the band 20. By providing a split band such as 20 the same may be sufficiently relaxed or the ends of thereof parted to permit the same to be slipped over the casing C. By pulling out the bolts from one lug 21 of each pair the ends of the band may be spread apart considerably to permit of quick application or removal of the band. The band 20 is provided with lips *i* for securing in position the tread member 2. The casing C and inner tube D is the same in all the modifications and are identified by the same reference letters in all the views.

It will be apparent from the foregoing that the invention is susceptible of considerable modification and other forms and detailed constructions may be devised without departing from the nature or spirit of my invention. While I prefer a metallic or steel reinforcng band, I am not to be restricted to any particular material so long as the same is puncture-proof. The invention obviously need not be limited in its application to pneumatic tires.

Having described my invention what I claim is:

In combination with a tire, a protecting transversely split tread band encompassing the tire and having its side edges beaded, the beads being removed for a suitable distance from the parted ends of the band thereby forming reduced terminals for the band, alining perforated lugs formed on the sides of said terminals, bolts for drawing said lugs together, and a wearing plate having its side edges beaded in continuation of the beads of the band and interposed between the tire and reduced terminals of the band.

In testimony whereof I affix my signature, in presence of two witnesses.

WILLIAM F. SPRENGNETHER.

Witnesses:
 EMIL STAREK,
 ELSE M. SIEGEL.